US005705021A

United States Patent [19]

Wurz et al.

[11] Patent Number: 5,705,021

[45] Date of Patent: Jan. 6, 1998

[54] LABEL APPLICATOR

[75] Inventors: Albert Wurz, Doylestown; Edward P. Yeh, Harleysville; Thomas J. Brobst, Allentown, all of Pa.

[73] Assignee: Accu-Sort Systems, Inc., Telford, Pa.

[21] Appl. No.: 479,368

[22] Filed: Jun. 7, 1995

Related U.S. Application Data

[63] Continuation-in-part of Ser. No. 235,157, Apr. 29, 1994, abandoned.

[51] Int. Cl.[6] .................... B32B 31/00; G05G 15/00

[52] U.S. Cl. .................... 156/360; 156/363; 156/364; 156/541; 156/542; 156/521; 156/DIG. 38; 156/382; 156/444

[58] Field of Search .................... 156/351, 360, 156/361, 362, 363, 364, 540, 541, 542, 510, 517, 521, DIG. 38, 285, 382, 444

[56] References Cited

U.S. PATENT DOCUMENTS

| | | | |
|---|---|---|---|
| Re. 30,419 | 10/1980 | Crankshaw et al. | 156/249 |
| 2,535,240 | 12/1950 | Spiller et al. | 164/48 |
| 3,232,815 | 2/1966 | Klopfenstein et al. | 156/360 |
| 3,329,550 | 7/1967 | Kucheck | 156/285 |
| 3,372,079 | 3/1968 | Fellner et al. | 156/360 |
| 3,729,362 | 4/1973 | French et al. | 156/542 |
| 3,772,120 | 11/1973 | Radzins | 156/521 X |
| 4,017,350 | 4/1977 | Thomas | 156/384 |
| 4,046,613 | 9/1977 | Kucheck et al. | 156/249 |
| 4,089,725 | 5/1978 | Crankshaw et al. | 156/299 |
| 4,124,429 | 11/1978 | Crankshaw | 156/364 |
| 4,201,621 | 5/1980 | Crankshaw et al. | 156/567 |
| 4,210,484 | 7/1980 | Crankshaw et al. | 156/542 |
| 4,255,220 | 3/1981 | Kucheck et al. | 156/285 |
| 4,267,004 | 5/1981 | Anderson | 156/361 |
| 4,276,112 | 6/1981 | French et al. | 156/360 |
| 4,314,869 | 2/1982 | Crankshaw | 156/215 |
| 4,321,103 | 3/1982 | Lindstrom et al. | 156/351 |
| 4,337,108 | 6/1982 | Crankshaw et al. | 156/285 |
| 4,349,405 | 9/1982 | Dudzik | 156/358 |
| 4,390,386 | 6/1983 | Bartl | 156/235 |
| 4,400,230 | 8/1983 | Wyslotsky | 156/361 |
| 4,473,429 | 9/1984 | Crankshaw | 156/483 |
| 4,475,978 | 10/1984 | Bartl | 156/497 |
| 4,566,933 | 1/1986 | Crankshaw et al. | 156/444 |
| 4,612,078 | 9/1986 | Karp | 156/493 |
| 4,612,079 | 9/1986 | Ostrow | 156/497 |

(List continued on next page.)

FOREIGN PATENT DOCUMENTS

| | | | |
|---|---|---|---|
| 0460281 | 12/1991 | European Pat. Off. | B65C 11/02 |
| 0476447 | 3/1992 | European Pat. Off. | B65C 9/18 |
| 2464195 | 5/1979 | France | B65C 9/26 |
| 8803034 | 5/1988 | Germany . | |
| 91078989 | 9/1991 | Germany | B65C 9/08 |
| 2076549 | 12/1981 | United Kingdom . | |
| 2092095 | 11/1982 | United Kingdom | B65C 9/18 |
| WO9301094 | 1/1993 | WIPO | B65C 9/18 |
| WO9308081 | 4/1993 | WIPO | B65C 9/18 |
| WO9323292 | 11/1993 | WIPO | B65C 9/42 |

*Primary Examiner*—David A. Simmons
*Assistant Examiner*—Paul M. Rivard
*Attorney, Agent, or Firm*—Volpe and Koenig, P.C.

[57] ABSTRACT

A label applicator for applying a label to the top surface of an object moving along a path adjacent to the applicator. The applicator is comprised of a label printer mounted for vertical adjustment on support structure attached to a fixed frame. The printer has a label feed position and is adjusted vertically on the support to set the label feed position to an expected median article height. A label transport assembly, attached to the frame, receives and retains the label and then moves vertically and laterally from a home position, above the label feed position, to an article intercept position, where it applies the label to the moving article. The controller learns the home position and positions the label transport assembly at the home position to pick up labels. The label printer, the label transport assembly, and the moveable frame are located alongside the object path such that when the label transport assembly is in the home position, the object path is vertically unobstructed.

12 Claims, 2 Drawing Sheets

U.S. PATENT DOCUMENTS 4,615,757 10/1986 Treiber .................................... 156/350
4,707,211 11/1987 Shibata .................................... 156/354
4,830,701 5/1989 Crankshaw et al. .................... 156/448
4,842,660 6/1989 Voltmer et al. ........................... 156/64
4,844,771 7/1989 Crankshaw et al. .................... 156/387
4,857,121 8/1989 Markley et al. ........................... 156/64
5,078,816 1/1992 Ratermann ................................ 156/64
5,133,827 7/1992 Ratermann ................................ 156/361
5,188,687 2/1993 Baum ....................................... 156/64
5,232,539 8/1993 Carpenter et al. ...................... 156/360

LABEL APPLICATOR

This application is a continuation-in-part of U.S. application Ser. No. 08/235,157 filed Apr. 29, 1994, now abandoned.

BACKGROUND OF THE INVENTION

1. Field of the Invention

The present invention is generally directed to a label applicator which applies a label to an article moving along a known travel path. More particularly, the present invention relates to a label applicator which is used to apply shipping labels to articles being transported on a conveyor system. Most particularly, the label applicator of the present invention finds use in the application of shipping labels to tops of articles of varying heights being carried on high throughput conveyor systems.

2. Description of the Prior Art

The use of automated labeling equipment for applying labels to moving, conveyor borne articles is known in the art. In one known system, the label is first printed with various label information by a label printer and the printed label is presented at the feed position where it is then retained against a grid by means of a vacuum. When the object to be labeled is moved into alignment with the label applicator, a blast of gas transfers the label to the article. One such prior art arrangement is shown in U.S. Pat. No. 3,329,550, which issued on Jul. 4, 1967.

However, when labels are to be applied to the top surfaces of packages of varying heights it is desirable to move the label retaining grid into closer proximity to the surface of the article to be labeled. One prior art device teaches the use of a plurality of hollow vacuum fingers which transfer a label to a surface and apply it by contact with the surface or with an air blast. This arrangement is disclosed in U.S. Pat. No. 4,729,362, which issued on Apr. 24, 1973. While this arrangement is satisfactory in some applications, it does not accommodate large variances in article heights.

Other label applicators, such as that disclosed by U.S. Pat. No. 4,615,757, which issued on Oct. 7, 1986, utilize a label printer mounted for horizontal movement above the conveyor with a gravity biased label applying arm which drops into contact with the article to apply the label. U.S. Pat. No. 5,232,539 discloses a movable printer/applicator head which is mounted over a conveyor and travels vertically along a fixed path to apply labels to articles of different heights.

In all of the prior art label applicators for applying labels to the tops of articles, the label printer and/or applicator are suspended above the conveyor path. This necessitates special handling for oversized packages which cannot pass beneath the labeling equipment. Additionally, the prior art label applicators which are mounted above the conveyor for top labeling of articles must travel from the label printer, which is located at a point above the maximum package height, down to the top surface of the package to apply the label, and then return to the printer for the next label. In systems where the label printer is combined with the applicator and is moved, either horizontally or vertically, into proximity with the package surface to be labeled, moving the mass of the label printer itself up and down to accommodate the various package heights requires heavy duty equipment for rapidly accelerating and decelerating the entire printer/applicator mass in high throughput applications.

Additionally, most of the prior art label printer/applicator assemblies use label stock wound on a supply reel and the spent backing strip is wound onto a take-up reel. The quantity of labels is limited by the size of the supply reel which can be accommodated by the equipment. Each time the supply reel runs out of stock, a new reel of label stock must be installed and threaded through the printer. The reels of spent backing paper must also be periodically removed.

Preferably, to maintain a high throughput of articles on the conveyor, the time between the time the application of labels on successively appearing products of different heights will be less than 1.0 seconds. Down time for adding new label stock must also be minimized.

SUMMARY OF THE INVENTION

The present invention provides a label applicator for applying a label to an article in motion along a given path. The label applicator has a label printer mounted for vertical adjustment on a support means attached to a fixed frame. The printer has a home, label feed position and is adjusted vertically on the support means to set the label feed position to an expected median article height. An articulated label transport means, attached to the frame, learns the home position, receives and retains the label and then moves to an article intercept position, where it applies the label to the moving article. The label printer, the label transport means, and the fixed frame are located alongside the object path such that when the label transport means is in the home position, the object path is vertically unobstructed.

It is an object of this invention to provide a label applicator for labeling articles on a high throughput conveyor system.

It is an object of this invention to provide a label applicator which, in the home position, leaves the article path vertically unobstructed.

It is an object of this invention to provide a label applicator in which the label printer is adjustable to an expected median article height and the label applicator learns the home position.

It is an object of this invention to provide an improved means for restocking the label supply to a label applicator assembly.

DESCRIPTION OF THE PREFERRED EMBODIMENT

Figure 1:
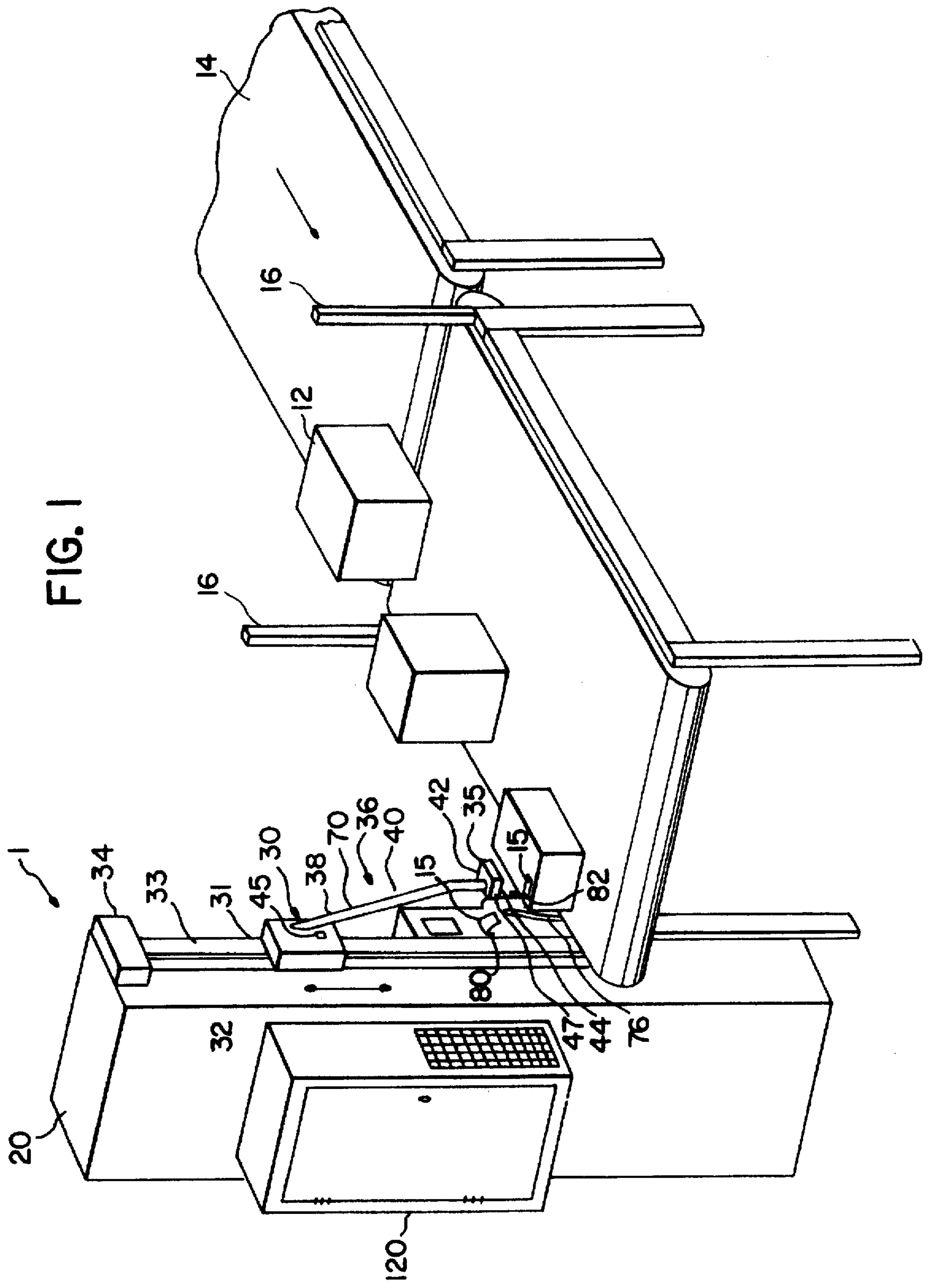
FIG. 1 is a perspective view of a label applicator in accordance with the present invention.

In FIG. 1, label applicator 1 in accordance with the present invention is shown positioned adjacent to a conveyor 14. Preferably, articles 12 are aligned with the label applicator side of the conveyor 14 and are moved by the conveyor in the indicated direction past a plurality of sensors which detect the article height and position data. As the article passes the label applicator 1, a label 15 is placed on the top article surface.

Figure 2:
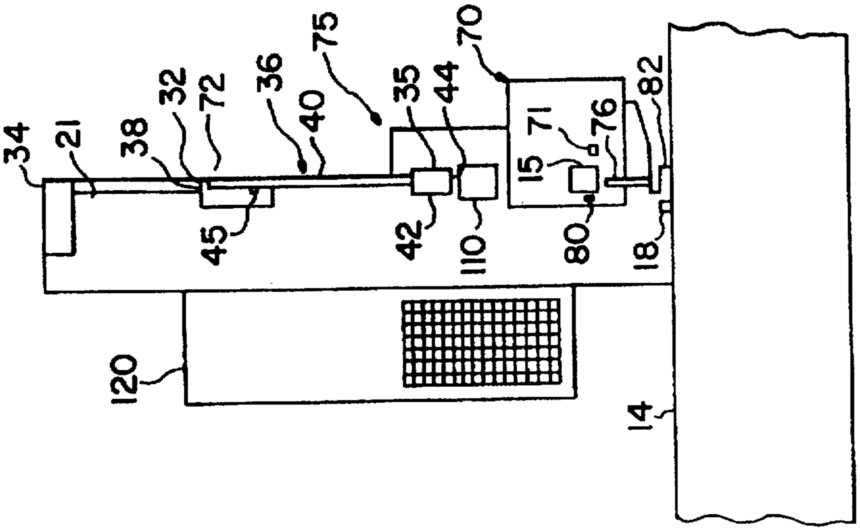
FIG. 2 is a front view of the preferred embodiment.

As shown in FIG. 2, label applicator 1 is comprised of a column 20 which supports the applicator assembly 30, the controller 120 and an enclosure 75 which includes the printer 70 and disposal assembly 110.

The applicator assembly 30 is comprised of a vertical actuator 31 which is mounted to column 20 adjacent to the conveyor 14. The vertical actuator 31 is driven by a servomotor 34 to vertically displace carriage 32 attached to the actuator 31. In the preferred embodiment, the vertical actuator 31 is a Macron Dynamics 6MM Linear Actuator.

A label transport assembly 36 is attached to the carriage 32. The transport assembly 36 has a rotary actuator 38 which is mounted on the carriage 32. The rotary actuator 38 moves a swing arm 40 between retracted and extended positions. A vacuum/blow plate 42 is attached to the swing arm 40. The vacuum/blow plate 42 has a plurality of apertures, as shown in FIG. 4, which is provided a vacuum source or air pressure source as is known in the art.

Figure 4:
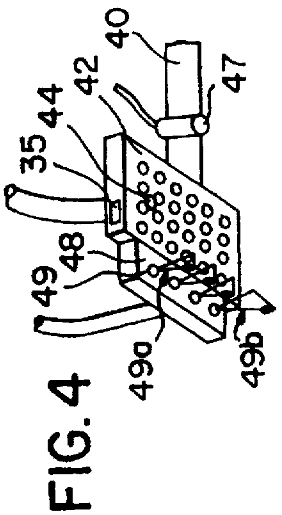
FIG. 4 is a perspective view of the vacuum/blow plate and air knife assembly.

As shown in FIG. 4, an air knife 48 is affixed to the end of the vacuum/blow plate 42. A blast of high pressure air is blown through apertures 49 of the air knife 48 after the label 15 is on the article surface to smooth the label 15 onto the surface and ensure that the label is firmly affixed. In the preferred embodiment, shown in FIG. 4 the air knife 48 has four apertures 49. The three outboard apertures 49 are set at a 20° angle *49a* from vertical in the direction of travel of the article 12. The remaining inboard aperture 49 is set at a 20° angle toward the side of the conveyor.

Referring to FIGS. 2 and 4, a plurality of sensors, described below, are mounted on the carriage 32 and the transport arm assembly 36. Collision detection sensor 35 is mounted on the end of swing arm 40 to detect if the article will strike the transport assembly 36. Label sensor 44 detects the presence of a label on the vacuum/blow plate 42. Look down sensor 47 is mounted adjacent to the vacuum/blow plate 42 to detect the presence of the article surface to be labeled. Position sensors 45 are positioned adjacent to the rotary actuator 38 to detect whether the linear actuator 38 is in the extended or retracted position.

Figure 3:
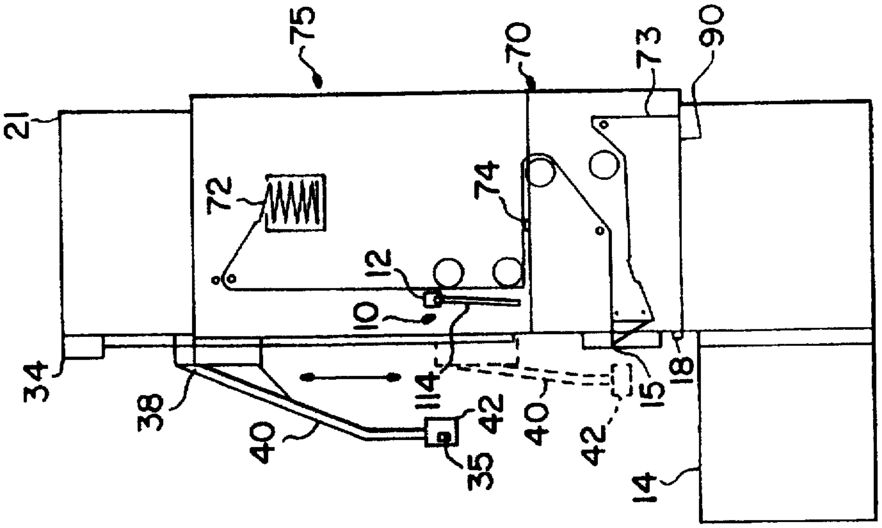
FIG. 3 is a side view of the preferred embodiment.

Referring to FIG. 3, enclosure 75 encompasses the printer 70, the label stock supply 72, the disposal assembly 110 and the takeup system. The enclosure is slidably mounted on the column 20 to allow adjustment of the enclosure to a median height for articles on the conveyor.

Label ready sensor 71 is mounted on the printer 70 adjacent to the label feed position of the printer 70. The home position sensor 80 detects the presence of the carriage 32 and signals controller 120 when the label transport assembly 36 is in the home position. A blow tube 76 is located beneath the label feed position to provide an air blast to assist in the transfer of the label 15 from the backing 73 to the vacuum/blow plate 42 on the transport assembly 36.

Figure 5:
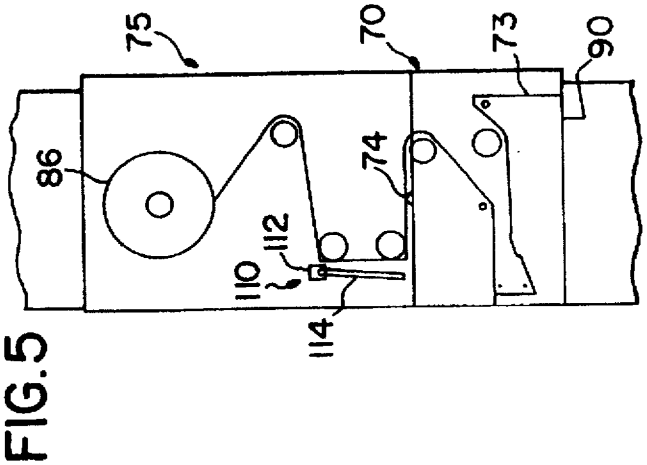
FIG. 5 is a side view of an alternative embodiment of the invention.

An electronic rotary cutter assembly 90 cuts down the continuous strip of backing 73 into small pieces 83 for easy disposal. As shown in FIGS. 5, the backing paper may also be spooled up into an auxiliary reel as known in the art.

Belt speed sensor 82, shown in FIGS. 1 and 2, is mounted adjacent to the conveyor belt and signals conveyor belt speed to the controller 120. Light curtain 16 which detects the article profile is attached to the conveyor. Speed sensors and light curtains are known in the art. An article detection sensor 18 is located in direct alignment with the vacuum/blow plate 42 to detect when the front of the article 12 reaches this position.

As shown in FIG. 3, fan fold label stock 72 is provided to the label printer 70. In the preferred embodiment, the supply of labels is stored above the printer 70. However, the label supply may be located in any position. The backing paper 73 is discharged from the printer as the label 15 is printed. Sensor 74 detects when the label supply is about to run out and signals the controller 120 to stop advancing the label stock 72 before it passes sensor 74. A new supply can then be spliced onto the existing stock without the need to rethread the label stock 73 through the printer 70. In an alternative embodiment of the invention as shown FIG. 3, the label stock 72 is provided on a spool 86.

Referring again to FIG. 3, a label disposal assembly 110 is mounted at a position directly above the printer 70. The label disposal assembly 110 is comprised of a rotary actuator 112 with an attached plate 114. When a label 15 cannot be applied, the rotary actuator 112 is actuated to swing the plate 114 out into the path of the retracted label transport arm 40, and the label 15 is applied to the plate 114.

Having provided a detailed description of the structure of the label applicator 1, a description of its operations follows with reference to FIG. 1. The printer applicator 1 is placed adjacent to a conveyor belt 14 and the conveyor belt speed sensor 82 is attached to the belt section. The height of the enclosure 75 is adjusted so that the label feed position is set to an expected median article height for the conveyor 14. The controller 120 initializes the minimum height above the conveyor 14 for the vertical actuator 31 and locates the home or label pick-up position. The home position is identified when optical sensor 80 detects the presence of the vertical carriage 46 as the actuator 31 moves the label transport assembly 36 up and down. The bottom travel limit for the vertical actuator 31 is set to approximately ⅜" above the conveyor surface.

As the article 12 passes the light curtain 16, height data is collected by the light curtain 16 and signaled to the controller 120. The conveyor belt speed is also signaled to the controller 120 by the belt speed sensor 82. Label data for the article 12 is provided to the controller 120. The controller 120 directs the printer 70 to print the label for the article 12. The vertical actuator 31 positions the vacuum/blow plate 42 above the home or label feed position. The position of the vacuum/blow plate is verified by the home position sensor 80. When the label 15 is complete, it is presented at the label feed position. The controller 120 activates a vacuum through the vacuum/blow plate 42. A blast of air from air pressure assist tube 76 blows the label 15 up towards the vacuum/blow plate 42. The label present sensor 44 on the vacuum/blow plate 42 senses when the label 15 is retained. If necessary, the vertical actuator 31 moves the transport assembly 36 to the label 15, to pick up the label.

The controller 120 then signals the vertical actuator 31 to move up or down, based on the height data collected from the light curtain 16, to the label application height for the article 12. If the transport assembly 36 must move up to get to the label apply position, rotary actuator 38 pivots out over the conveyor 14 after the transport assembly 36 is in the proper vertical position. If the transport assembly 36 must move down to the label apply position, the rotary actuator 38 is extended during the vertical travel. The collision avoidance sensor 35, located on the end of the swing arm 40 detects if the article 12 is in a position where it may strike the label transport arm assembly 36. If a collision is imminent, the controller 120 raises and retracts the transport arm assembly 36 to avoid an impact. The article detect sensor 18 signals the controller 120 when the article 12 passes directly in front of the vacuum/blow plate 42. The look down sensor 47 then signals the controller 120 to confirm that the article surface 12 is directly below and in close proximity to the vacuum/blow plate 42. The controller 120 waits for the label application point to pass under the vacuum/blow plate 42 and, when the point is presented, reverses the vacuum to a high pressure blast of air to apply the label 15 to the article 12. The label is then smoothed down onto the article surface with a blast of air from the air knife 48 to ensure adherence.

If the transport arm assembly 36 is below the home/label pick-up position, the controller 120 signals the vertical actuator 31 to move the transport arm assembly 36 vertically to the home position, and the arm 40 is retracted by rotary actuator 38 after the vertical movement is completed. If the transport assembly 36 is above the home position, the arm 40 is retracted by the rotary actuator 38 prior to vertical movement by the vertical actuator 31. Position sensor provides data on arm 40 to the controller 120. The process is then repeated for the next article. The transport arm assembly 36 can be programmed to reach over obstructions of limited height and width such as conveyer package guides.

If a label 15 cannot be applied, the controller 120 directs the linear actuator 38 to retract the swing arm 40. The label 15 is then carried by the vertical actuator 31 to the label disposal assembly 110. If the label transport assembly 36 is above the disposal assembly 110, the controller 120 simultaneously actuates the actuator 112 to swing the plate 114 into position as the transport arm assembly 36 is retracted by rotary actuator 38 and moved down into a position above the plate 114. The label is then disposed of by blowing it onto the plate 114. If the label transport arm assembly 36 is below the disposal assembly 110, the transport arm assembly 36 is raised to the height of the disposal plate 114 as it is being moved into position, and the rotary actuator 38 is retracted prior to blowing the label onto the plate 114.

In the preferred embodiment, the system controller 120 is an 80386 processor.

While the present invention has been described in terms of the preferred embodiments, the advantages of utilizing an applicator which does not vertically obstruct the article path as well as a height adjustable printer will be recognized by those skilled. It will be understood that the invention is not limited to the preferred embodiments, and that changes may be made herein without departing from the scope of the invention.

We claim:

1. A label applicator for applying a label to an article in motion along a given path, the applicator comprising:

an enclosure including a printer, a label supply, a disposal assembly, and a take up system, said enclosure mounted for vertical adjustment on a fixed column alongside the article path, the enclosure has a label feed position and is adjusted vertically along the column to set the label feed position to an expected median article height;

pivotal label transport means, located adjacent to the label printer, which is driven vertically to a home position above the label feed position where it is not over the article path when it receives and retains the label, and then moves vertically to an article intercept position and pivots outward to apply the label, said label transport means including a collision detector means for retracting the transport means to prevent collision with the article;

means for locating the home position and transmitting home position data to a controller;

article height detection means which measures the article height on the conveyor and transmits article geometry and position data to the controller; and a controller which receives the label feed position data and the article height data, directs the printer to print the label, directs the label transport means to the home position where it receives the label, directs the label transport means from the home position along side the article path to all article intercept position that is also along side the article path in response to the article height data, activates the label transport means to move outwardly and apply the label to the article, and directs the label transport means to return to the home position, said controller including a remote keypad and a display.

2. The label applicator of claim 1 further comprising a secondary non-contact pneumatic means for smoothing a label onto the article surface to ensure adherence.

3. The label applicator of claim 1 further comprising cutter means for cutting a strip of expended label backing material into pieces for disposal.

4. The label applicator of claim 1 further comprising a flat linear surface for splicing additional labels onto the label supply.

5. A label applicator of a type for applying a label to an article by retaining the label on a transport means and transferring the label from the transport means to the article by a blast of gas, wherein the applicator includes:

a first, pneumatic transport means for retaining a label by vacuum and for transferring the label to the article by a blast of gas, and a second, non-contact pneumatic means for blowing on the label after it is on the article to smooth the label and ensure adherence.

6. The applicator of claim 5 wherein the non-contact pneumatic means is an air knife which applies a blast of high pressure gas to the label.

7. The applicator of claim 5 wherein the second non-contact pneumatic means is attached to the label transport means.

8. A label applicator for applying a label to an article in motion along a given path, the applicator comprising:

label printing means; for providing a printed label at a label feed position, positioned alongside the article path in a plane parallel thereto said means mounted for vertical adjustment to an expected median article height;

label transport means, located adjacent to the label printing means, that moves to the label feed position where it is not over the article path and obtains the printed label and then moves vertically to an article intercept position and pivots outwardly and over the article path to apply the label on the article;

means for locating the label feed position and transmitting label feed position data to a controller;

article detection means which measures the article height and transmits article height and position data; and a controller which receives the data on label feed position, and article position, directs label printing; label transporting; and label application in accordance with that data and then return the label transport inwardly and away from the article path.

9. A label applicator for applying a label to an article conveyed along a given path, the applicator comprising:

a label means including a printer, a label supply, and a take up system, mounted on a fixed column alongside the article path for vertical adjustment to locate a label feed position at a predetermined height;

a label transport assembly;

means for determining label feed position data;

an article detection means which determines article geometry and article position data; and a controller which receives the label feed position data, the article geometry data and the article position data; determines a home position where the label transport assembly is aligned with the label feed position and is not over the article path; directs the printer to print the label; directs the label transport assembly to the home position where it receives and retains the label; directs the label transport assembly to an article intercept position as defined by the article geometry data; pivots the label transport assembly outwardly and over the article path where it applies the label to the article; and, returns the label transport assembly to return to the home position.

10. The label applicator of claim 9 further comprising a secondary non-contact pneumatic means for smoothing a label onto the article surface to ensure adherence.

11. The label applicator of claim 9 further comprising cutter means for cutting a strip of expended label backing material into pieces for disposal.

12. The label applicator of claim 9 further comprising a flat linear surface for splicing additional labels onto the label supply.

* * * * *

UNITED STATES PATENT AND TRADEMARK OFFICE

CERTIFICATE OF CORRECTION

PATENT NO. : 5,705,021

DATED : January 6, 1998

INVENTOR(S) : Wurz et al.

It is certified that error appears in the above-identified patent and that said Letters Patent is hereby corrected as shown below:

At column 6, line 6, delete "all" and insert therefor --an--.

Signed and Sealed this

Thirty-first Day of March, 1998

Attest:

BRUCE LEHMAN

*Attesting Officer*

*Commissioner of Patents and Trademarks*